(12) United States Patent
Fullenkamp

(10) Patent No.: US 7,232,281 B2
(45) Date of Patent: Jun. 19, 2007

(54) MOTORCYCLE TRANSPORTING DEVICE

(76) Inventor: Rick Fullenkamp, 1507 N. Meridian St., Portland, IN (US) 47371

(*) Notice: Subject to any disclaimer, the term of this patent is extended or adjusted under 35 U.S.C. 154(b) by 348 days.

(21) Appl. No.: 11/037,942

(22) Filed: Jan. 18, 2005

(65) Prior Publication Data

US 2006/0159541 A1    Jul. 20, 2006

(51) Int. Cl.
*B60P 7/08* (2006.01)
(52) U.S. Cl. .................. 410/3; 410/7; 410/80
(58) Field of Classification Search .......... 410/2, 410/3, 7, 80; 224/403, 568, 569, 924; 248/500
See application file for complete search history.

(56) References Cited

U.S. PATENT DOCUMENTS

| 6,109,494 | A | 8/2000 | Pilmore |
| D466,842 | S | 12/2002 | Lems |
| 6,715,972 | B2 * | 4/2004 | Jackson, Sr. ................. 410/97 |

* cited by examiner

*Primary Examiner*—Stephen Gordon
(74) *Attorney, Agent, or Firm*—Woodward, Emhardt, Moriarty, McNett & Henry LLP

(57) ABSTRACT

A motorcycle transporting device, comprising a docking bar receiver, including a pair of stationary brackets, each having corresponding apertures therethrough, that are permanently affixable to a frame of a motorcycle; a docking bar assembly that is removeably insertable through corresponding apertures in the docking bar receiver when the motorcycle is to be transported, and that is removeably secured therethrough without the use of tools with a removeable securing pin; a docking station that is mountable to a bed of a transporting device, having a pair of opposed rotating capture mechanisms that automatically capture the docking bar assembly therein, and each rotating capture mechanism having foot pedal apparatus to simultaneously release the docking bar assembly from each rotating capture mechanism; and secondary security apparatus to secure the docking bar assembly within the rotating capture mechanism when the transporting device is in motion.

5 Claims, 6 Drawing Sheets

MOTORCYCLE TRANSPORTING DEVICE

The present invention relates generally to motorcycle transport devices, and more specifically to a motorcycle transporting device useful for transporting a motorcycle when not in use.

Motorcycle transport systems are known in the art. One such system was described in U.S. Pat. No. 6,109,494, but the system disclosed therein has several practical deficiencies. First, middle pin brackets 50A–B must be bolted to the permanent bracket 60 on the motorcycle frame each time the motorcycle is to be transported. Secondly, capture of the docking pegs 54A–B of middle pin brackets 50A–B by the docking structure is performed manually with foot pedals that must be engaged independently, and thus separately, on each side of the docking structure. Once the motorcycle is manually captured there is no secondary security means provided to assure that the engagement of the motorcycle by the hauling device does not come undone. The release of the motorcycle from the docking structure is also accomplished by foot pedals that release the locking pin, but they must be manipulated in conjunction with each other separately on each side of the docking structure.

These deficiencies in the motorcycle transport system of U.S. Pat. No. 6,109,494, have led to practical difficulties in its use.

SUMMARY OF THE INVENTION

The motorcycle hauling device of the present invention addresses and overcomes the practical deficiencies of the motorcycle transport system of U.S. Pat. No. 6,109,494.

First, once the docking structure of the present invention is secured to a transport device, and the docking bar receiver of the present invention is permanently attached to a motorcycle, no further tools are required to engage and to transport the motorcycle. Most significantly, the capture of the docking structure of the present invention is automatic, and not manual. Furthermore a secondary security means is provided in the motorcycle hauling device of the present invention to insure that once captured the motorcycle does not free itself, and the release of the motorcycle from the docking structure of the present invention is by a single foot pedal that releases both sides of the docking bar simultaneously, and which is operable from either side of the docking structure.

One embodiment of the motorcycle transporting device of the present invention comprises a docking bar receiver, including a pair of stationary brackets, each having corresponding apertures therethrough, that are permanently affixable to a frame of a motorcycle; a docking bar assembly that is removeably insertable through corresponding apertures in the docking bar receiver when the motorcycle is to be transported, and that is removeably secured therethrough without the use of tools with a removeable securing pin; a docking station that is mountable to a bed of a transporting device, having a pair of opposed rotating capture mechanisms that automatically capture the docking bar assembly therein, and each rotating capture mechanism having foot pedal apparatus to simultaneously release the docking bar assembly from each rotating capture mechanism; and secondary security apparatus to secure the docking bar assembly within the rotating capture mechanism when the transporting device is in motion.

Related objects of the present invention will be revealed in the following written description thereof.

DESCRIPTION OF THE PREFERRED EMBODIMENT

Figure 1:
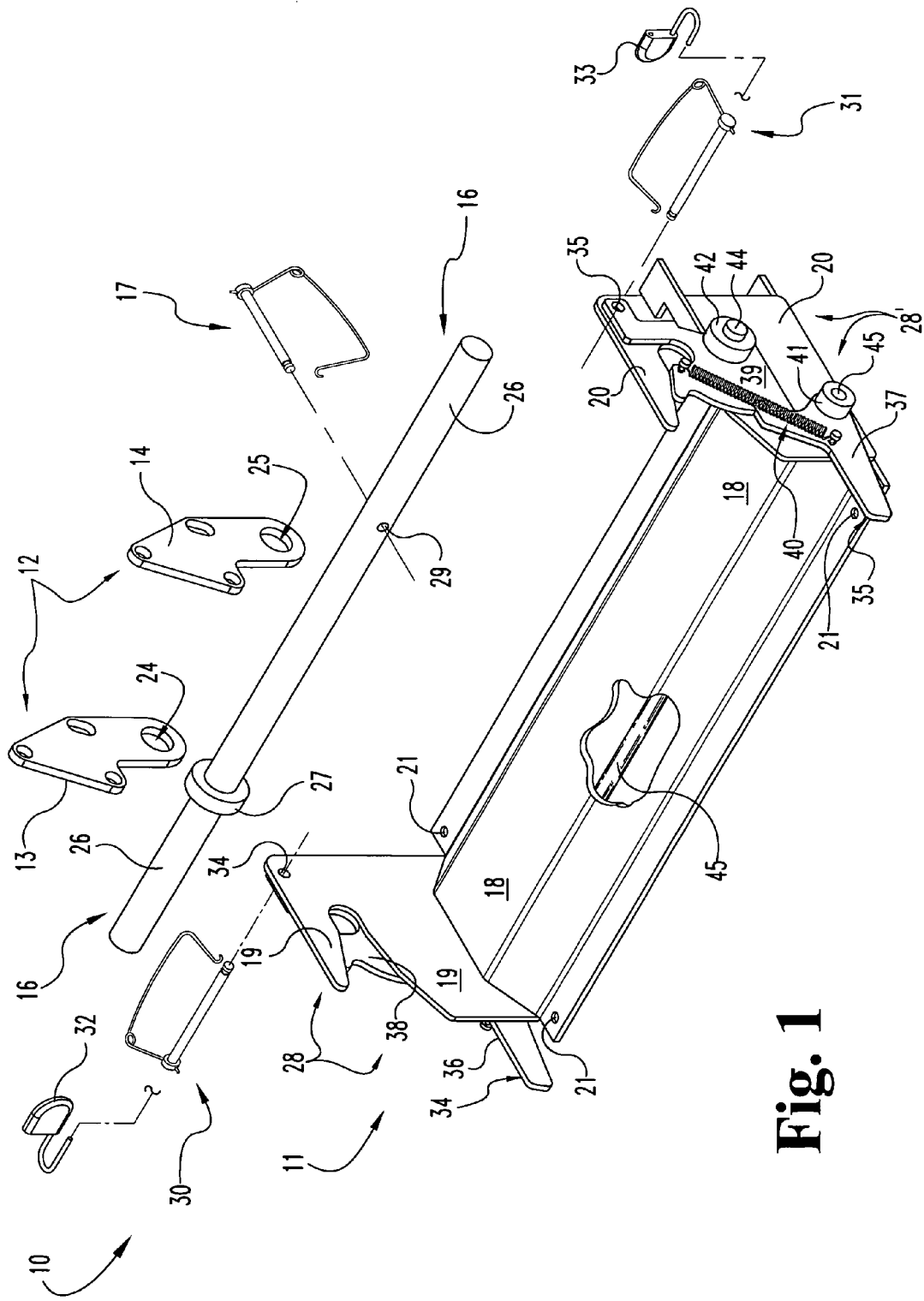
FIG. 1 An exploded perspective view of the present invention.
Figure 2A:
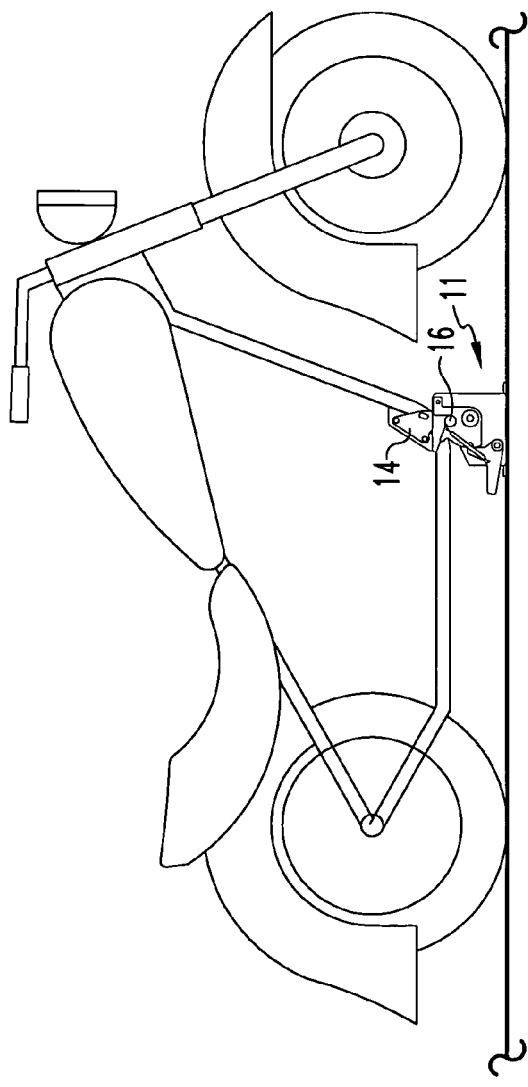
FIG. 2A–B A side (2A) and front (2B) view of the present invention in the secured position.
Figure 2B:
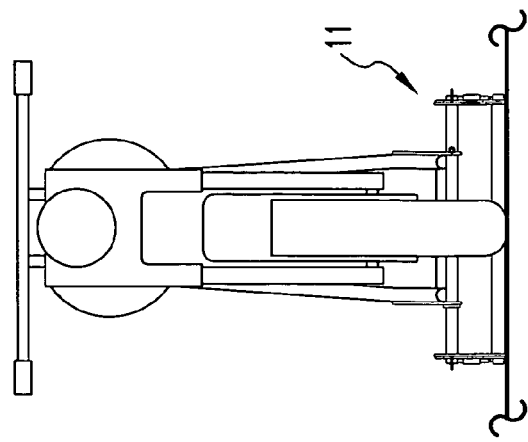
Figure 3:
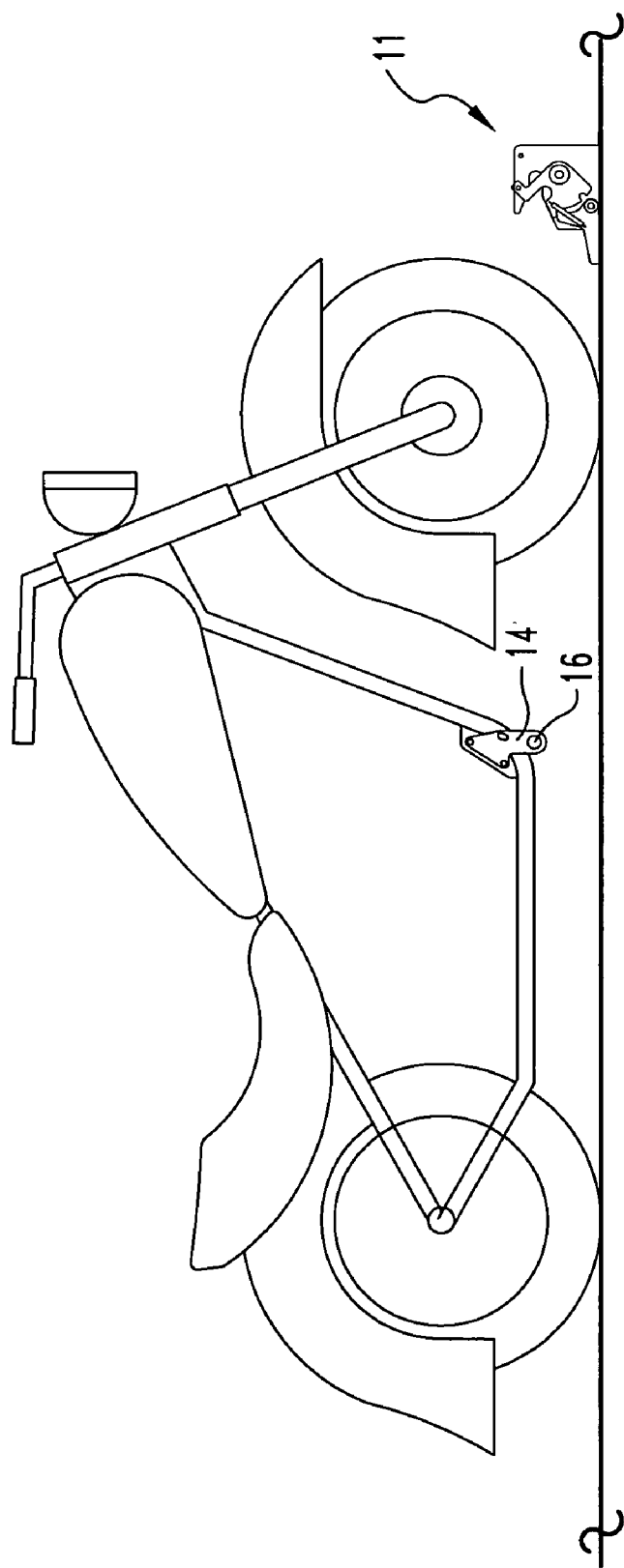
FIG. 3 A side view of the present invention in the released position.

Referring now to the drawings, FIGS. 1 thru 3 illustrate a preferred motorcycle transporting device of the present invention 10, which comprises a docking station 11 mountable to a bed of a transportation device, a docking bar receiver 12 consisting of a pair of stationary brackets 13, 14 that can be permanently attached to the frame of a motorcycle, a docking bar assembly 16, which, when in use, is inserted through the pair of stationary docking bar receiver brackets 13, 14 and secured with a securing pin 17.

Figure 4:
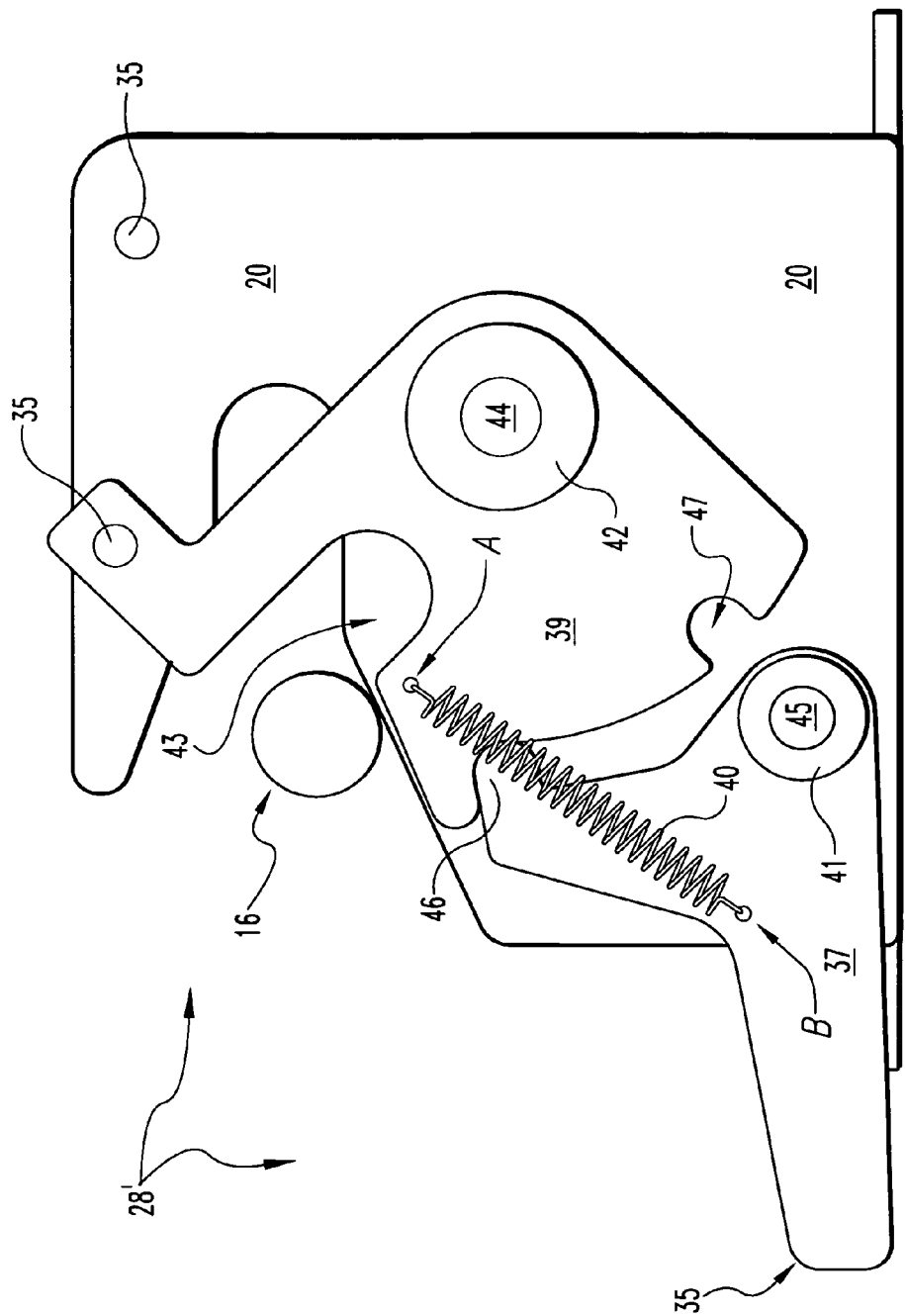
FIG. 4 An enlarged view of the rotating capture mechanism.

As best shown in FIGS. 1 and 4, the docking station 11 is comprised of a formed steel rectangular base 18 that has attached at opposite ends a vertical receiver member 19, 20. Holes 21 are provided in the base 18 for attaching it to the bed of a transporting device. An automatic capture mechanism 28, $28^1$ is assembled on each vertical receiver member 19, 20, which is described in detail in FIGS. 5A–H discussed below.

As best shown in FIGS. 1 and 3, the docking bar receiver brackets 13, 14 are designed to be permanently attached to the frame of a motorcycle. These brackets 13, 14 have apertures 24, 25 that receive the docking bar 16. These brackets 13, 14 are specifically designed to attach to every make and model of motorcycle. They are mounted in an area on the motorcycle where they will not interfere with the safe operation of the motorcycle.

As best shown in FIGS. 1 and 3, the docking bar assembly 16 consists of a docking bar 26, a securing pin 17, and a locking collar 27. In use, the docking bar 26 is inserted through the apertures 24, 25 in each stationary bracket 13, 14, which are mounted on the motorcycle and secured with the securing pin 17 through hole 29.

In use, the user secures the docking station 11 to the bed of a transporting device, such as a trailer or a pick-up truck. The user then secures the stationary docking bar receiver brackets 13, 14 to the frame of the motorcycle. This step is done only once as the brackets 13, 14 are designed to be permanently installed. The user then inserts the docking bar 26 through the apertures 24, 25 in the docking bar receiver stationary brackets 13, 14 and inserts the securing pin 17 through the docking bar 26. As best shown in FIG. 1, the lateral movement of the docking bar is controlled by the locking collar 27 and the securing pin 17. The user moves the motorcycle forward onto the docking station 11 until the docking bar 26 is guided into the vertical receiver members 19, 20 and is automatically captured by the capture mechanisms 28, $28^1$ as described in detail in FIG. 5A–H, discussed below. The user then inserts securing pins 30, 31 or padlocks 32, 33 through the corresponding through holes 34, 35 in the vertical receiver members 19, 20 and the rotating capture members 38, 39. The user then transports the motorcycle upon the transporting device to the desired location. When the user desires to unload the motorcycle, the user first removes the securing pins 30, 31 or padlocks 32, 33 from the docking station 11. The user then boards the motorcycle and when ready and in control, steps on either pedal section 34 or 35 of the rotating catch members 36, 37 on either side, which releases both rotating capture members 28, 28¹ simultaneously and allows the motorcycle to be backed from the docking station 11. The user then removes the docking bar 16 so as not to interfere with the safe operation of the motorcycle.

DESCRIPTION OF THE PREFERRED AUTOMATIC CAPTURE MECHANISMS

Referring now to FIG. 4, the automatic capture mechanism 28¹ consists of a vertical receiver member 20, a rotating capture member 39, a rotating catch member 37, a spring 40, and two shaft locking collars 41 and 42.

The vertical receiver member 20 consists of a steel plate with a contoured U-shaped slot 43 to guide and receive the docking bar 16, which has been mounted on the motorcycle as described above. The rotating capture member 39 consists of a shaped steel plate that mounts on a shaft 44 protruding from the vertical receiver member 20. The rotating capture member 39 rotates freely on the shaft 44 and is held in place with the shaft locking collar 42.

The rotating catch member 37 consists of a shaped steel plate that mounts on a shaft 45 protruding from the vertical receiver member 20. The rotating catch member 37 rotates with the shaft 45 and is held in position on shaft 45 with the shaft locking collar 41. The spring 40 attaches to the rotating capture member 39 at location "A" and to the rotating catch member 37 at location "B".

The automatic capture mechanism 28 is constructed in the same manner on the opposite side of the docking station 11. Shaft 45 extends across the docking station and rotating catch member 36 also rotates with the shaft 45. So when rotating catch member 37 rotates, rotating catch member 36 rotates simultaneously.

OPERATION OF THE PREFERRED AUTOMATIC CAPTURE MECHANISM

Using FIG. 4 to identify the parts in FIGS. 5A–H will illustrate how the automatic capture mechanism 28¹ works.

Figure 5A:
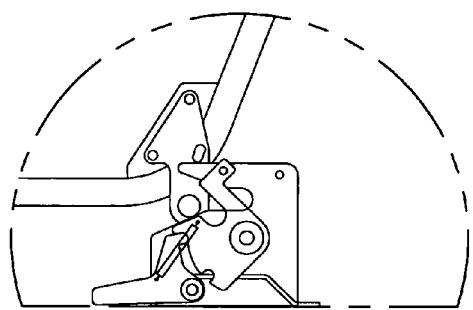
FIG. 5A–H Sequential views of the rotating capture mechanism.

In FIG. 5A, a motorcycle, with the docking bar 16 installed, approaches the docking station 11 and is guided by the profile of the vertical receiver member 20.

Figure 5B:
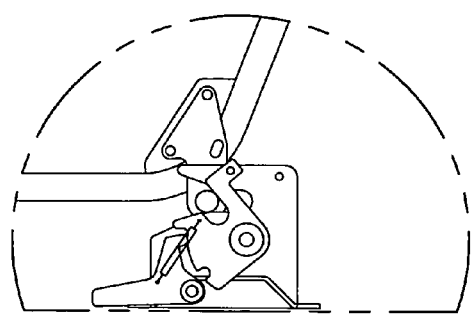

In FIG. 5B, the motorcycle continues to advance. As it does, the docking bar 16 strikes the rotating capture member 39 causing it to rotate on it's axis 44. Notice how the spring 40 pulls on the rotating catch member 37.

Figure 5C:
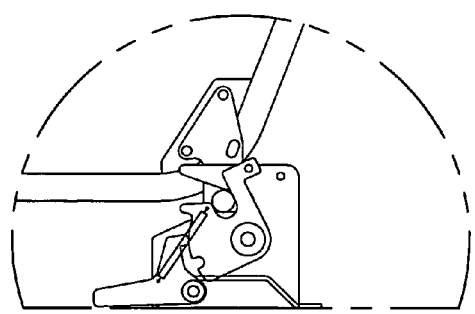

In FIG. 5C, as the motorcycle continues to advance, the capture of docking bar 16 progresses.

Figure 5D:
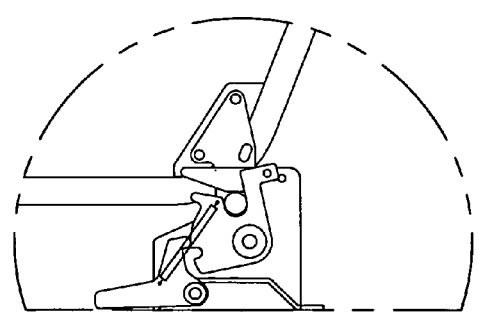

In FIG. 5D, as the motorcycle continues to advance, note the position of the nose 46 of the rotating catch member 37 in relation to the notch 47 in the rotating capture member 39. Also note the position of the hole 35 in the rotating capture member 39 in relation to the hole 35 in the vertical receiver member 20.

Figure 5E:
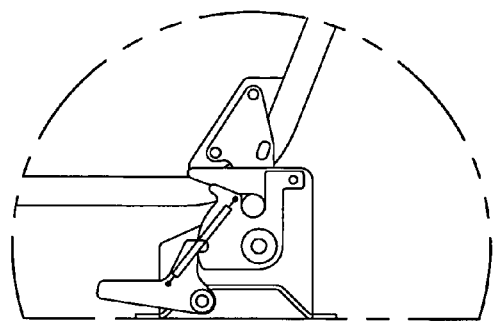

In FIG. 5E, the motorcycle, with the docking bar 16 installed, has reached the end of the slot 43 in the vertical receiver member 20. The rotating capture member 39 has rotated to a position where the nose 46 of the rotating catch member 37 has been pulled by the spring 40 into the notch 47 in the rotating capture member 39, thus locking the motorcycle into the docking station 11. Also note how the hole 35 in the rotating capture member 39 and the hole 35 in the vertical receiver member 20 now line up for the insertion of a securing pin 31 or a common padlock 33.

Figure 5F:
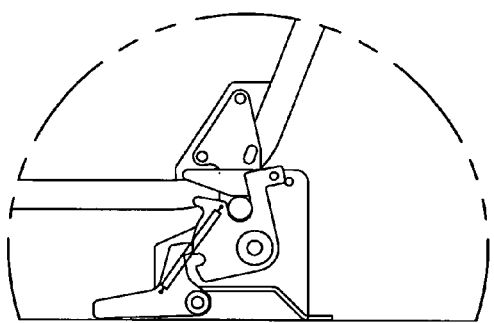

In FIG. 5F, the release of the motorcycle from the docking station 11 may be accomplished by the user stepping on the pedal section 35 of the rotating catch member 37, which pulls the nose 46 of the rotating catch member 37 from the notch 47 in the rotating capture member 39, freeing the docking bar 16 simultaneously from rotating capture members 38, 39 and allowing the motorcycle to be backed out of the docking station 11. Stepping on the pedal section 34 would have had the same result.

Figure 5G:
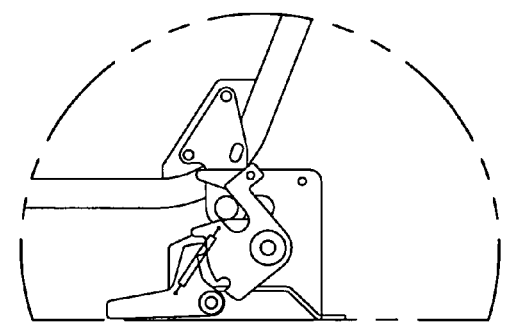

In FIG. 5G, as the motorcycle has been backed out, the release of the docking bar 16 continues with the spring 40 pulling the rotating capture member 39 back to it's open position.

Figure 5H:
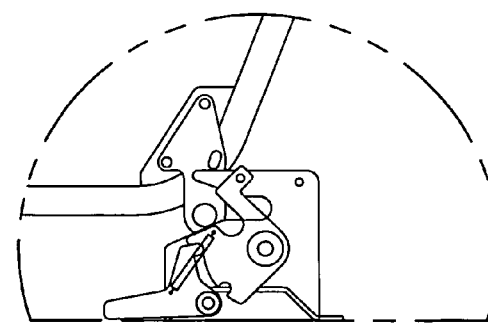

In FIG. 5H, the motorcycle is completely released, and the docking station 11 is returned to its open and ready position.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are described to be protected.

I claim:

1. A motorcycle transporting device, comprising
   a docking bar receiver, including a pair of stationary brackets, each bracket having corresponding apertures therethrough, said brackets are permanently affixable to a frame of a motorcycle;
   a docking bar assembly that is removeably insertable through said corresponding apertures in the docking bar receiver when the motorcycle is to be transported, and that is removeably secured therethrough without the use of tools with a removeable securing pin;
   a docking station that is mountable to a bed of a transporting device, having a pair of opposed rotating capture mechanisms that automatically capture the docking bar assembly therein, and each rotating capture mechanism having foot pedal means to simultaneously release the docking bar assembly from each rotating capture mechanism; and
   secondary security means to secure the docking bar assembly within the rotating capture mechanisms when the transporting device is in motion.

2. The motorcycle transporting device of claim 1, wherein the docking bar assembly includes a docking bar, a locking collar and said securing pin, whereby lateral movement of the docking bar assembly is controlled by the locking collar and the securing pin.

3. The motorcycle transporting device of claim 2, wherein the automatic capture mechanisms each include a vertical receiver member, a rotating capture member, a rotating catch member, and a spring that biases the rotating capture member.

4. The motorcycle transporting device of claim 3 wherein the catch members of each automatic capture mechanism rotate about a common axis, whereby when one said rotating catch member rotates, the opposed rotating catch member rotates simultaneously.

5. The motorcycle transporting device of claim 4 wherein the foot pedal means includes foot pedal sections on each rotating catch member.

* * * * *